L. BOUDREAUX.
Machine for Cleaning and Carding Moss.
No. 17,954. Patented Aug. 4, 1857.
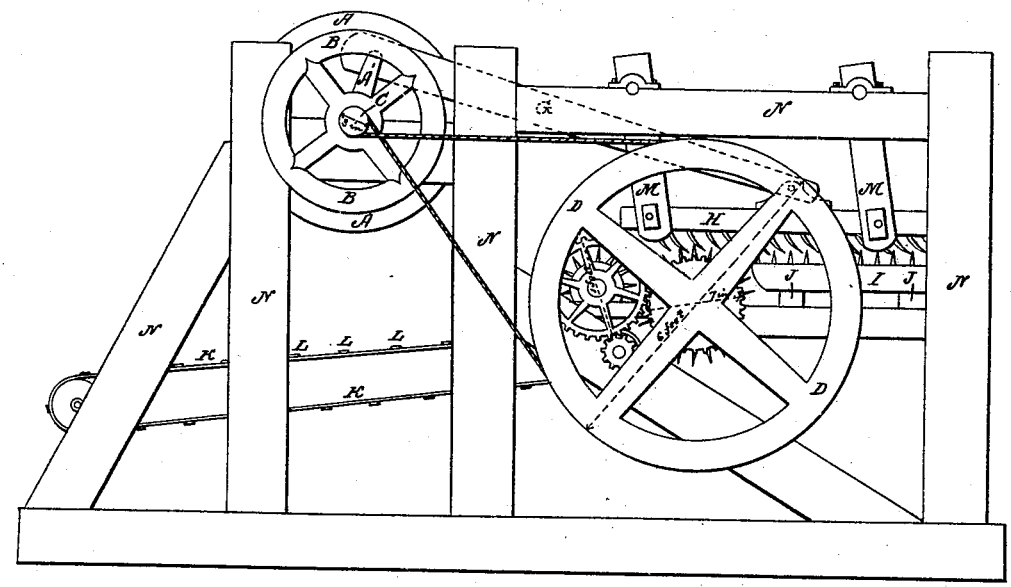
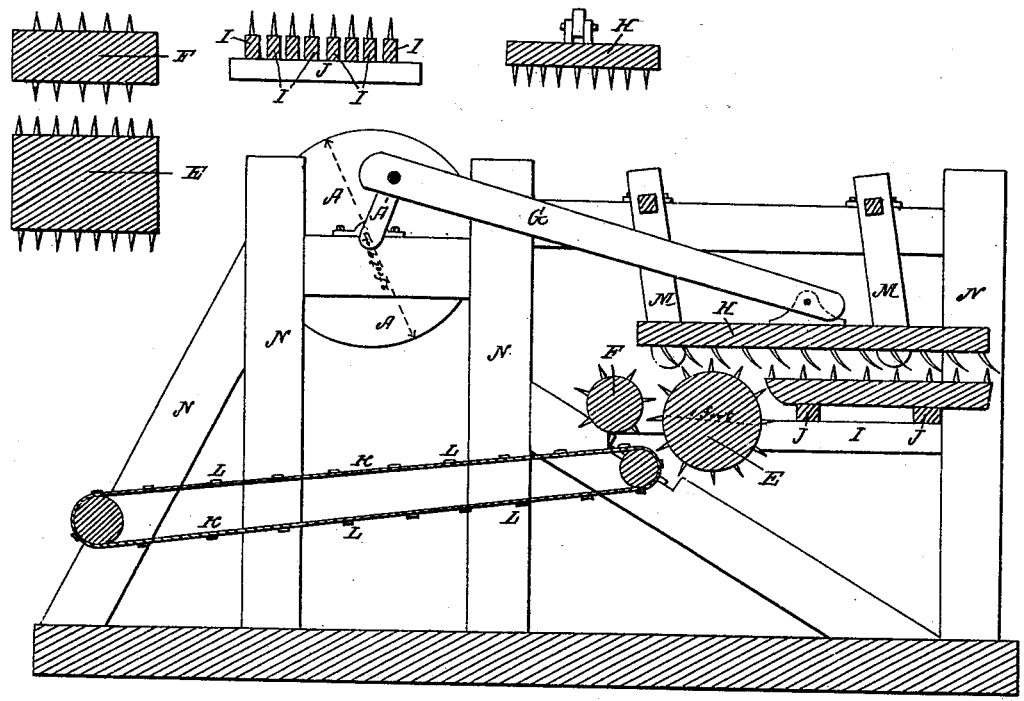

UNITED STATES PATENT OFFICE.

L. BOUDREAUX, OF THIBODEAUX, LOUISIANA.

IMPROVEMENT IN CLEANING AND CARDING MOSS.

Specification forming part of Letters Patent No. 17,954, dated August 4, 1857.

*To all whom it may concern:*

Be it known that I, LOUIS BOUDREAUX, of the town of Thibodeaux, in the parish of La Fourche and State of Louisiana, have invented a new and useful machine for cleaning the moss of trees, lichen, muscus, arbosays, and carding the same previous to its being baled for market and use; and I do hereby declare that the following is a full and exact description thereof, reference being had to the accompanying drawings, in which—

Figure 1 is a side elevation of the machine; Fig. 2, a longitudinal section through the center thereof; and Figs. 3, 4, 5, and 6 are views of parts that will be hereinafter explained and noticed.

To enable others skilled in the art to make and use my invention, I will proceed to describe its construction and operation, viz:

A is a cog or band wheel, which may be driven by any suitable power, placed on a shaft rolling on a suitable frame, N. A pulley, C, on this end of main shaft, and outside of the frame, is connected by a driving-belt or other suitable connection to a wheel, D, attached to a toothed cylinder, E, as seen in section, Fig. 6, which gears with a small toothed roller, F, (seen in section, Fig. 5,) which drives a pinion on the end of a plain roller, that gives motion to the endless feed-apron K, which traverses beneath the main shaft and within the frame N. The teeth in the cylinder E and roller F may be made of any suitable metal, and must be placed perpendicularly to the axis of each, and may be placed in right lines and in any suitable number desired. I have found the relative number of ninety-six in E to thirty-five in F to produce good results. The bed I (seen in section, Fig. 3,) is securely fastened to the frame N on cross-pieces or otherwise, J J, so that its upper surface shall be on a plane with the top of cylinder E. A series of teeth of suitable lengths are placed right lines and projecting through the bed, to which they may be secured in any proper manner, and made of any suitable metal. I have found iron teeth to answer well. This bed may be made of separate pieces, and so arranged as to leave spaces between them, so as to permit the escape of any refuse matter that may be carded out of the moss. About the center of the main shaft or on a driving-wheel a crank is placed, (marked A',) which drives a pitman, G, which connects at its other end to a vibrating bed, H. This bed H is of the same width as the bed I, but of sufficient length to cover, not only the bed I, but also the cylinder E and roller F, and has on its under side a series of teeth, standing at an angle of about forty-five degrees and projecting forward from the main shaft. It is hung upon four arms, M, that drop from the ends of two rock-shafts, placed at suitable distances apart, and to let the bed H vibrate between the timbers of the frame, and may be adjustable to any distance to make the teeth of the upper and lower beds work at the proper distance from the face of the bed-plate.

The operation is as follows: The apron K, being covered with the moss to be cleaned, receives motion through the gearing on roller F and cylinder E in the direction of the roller F, which presses the moss between the teeth of the cylinder E, by which it is carried up to a position upon the teeth of the upper vibratory bed, clasps the moss from the roller and cylinder, moving it forward at each vibration produced by the revolution of the crank on the main shaft until the moss is passed entirely over the stationary bed and through its teeth, whence it is delivered out free from nearly all dust, dirt, and impurities that adhere to it in its crude condition.

It is obvious that my machine may be used for other purposes, such as combing wool, carding cotton, and thrashing or separating grain from its straw, &c.; but I do not claim it for any such purpose. Now,

What I claim, and desire to secure by Letters Patent, is—

The combination of the vibrating bed H with the bed I, and the teeth arranged as described with relation to the cylinder E and roller F, operating in the manner set forth.

LOUIS BOUDREAUX.

Witnesses:
B. CAMPBELL,
JOHN D. STINCHCOMB.